(12) United States Patent
Lin et al.

(10) Patent No.: US 9,529,581 B2
(45) Date of Patent: Dec. 27, 2016

(54) CIRCUIT AND METHOD FOR WRITING PROGRAM CODES OF BASIC INPUT/OUTPUT SYSTEM

(71) Applicant: Giga-Byte Technology Co., Ltd., New Taipei (TW)

(72) Inventors: Hou Yuan Lin, New Taipei (TW); Tse Hsine Liao, New Taipei (TW); Chih Wei Huang, New Taipei (TW); Pi-Chiang Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 62 days.

(21) Appl. No.: 14/683,040

(22) Filed: Apr. 9, 2015

(65) Prior Publication Data
US 2016/0026454 A1    Jan. 28, 2016

(30) Foreign Application Priority Data
Jul. 22, 2014    (TW) .............................. 103125056 A

(51) Int. Cl.
*G06F 11/22* (2006.01)
*G06F 9/44* (2006.01)
*G06F 9/445* (2006.01)

(52) U.S. Cl.
CPC ................ *G06F 8/65* (2013.01); *G06F 8/665* (2013.01); *G06F 9/4406* (2013.01); *G06F 11/22* (2013.01); *G06F 9/4401* (2013.01)

(58) Field of Classification Search
CPC ............ G06F 8/65; G06F 8/665; G06F 11/22; G06F 9/4406
See application file for complete search history.

(56) References Cited

U.S. PATENT DOCUMENTS

| | | | |
|---|---|---|---|
| 6,421,792 B1 * | 7/2002 | Cromer | G06F 11/1417 713/2 |
| 7,003,659 B2 * | 2/2006 | Rich | G06F 15/177 713/1 |
| 7,805,637 B2 * | 9/2010 | Van Haegendoren | G06F 11/1417 714/47.1 |
| 2002/0147941 A1 | 10/2002 | Gentile | |
| 2003/0005277 A1 | 1/2003 | Harding | |
| 2006/0288202 A1 | 12/2006 | Doran et al. | |
| 2009/0063834 A1 | 3/2009 | Huang | |

* cited by examiner

*Primary Examiner* — Stefan Stoynov
(74) *Attorney, Agent, or Firm* — Jianq Chyun IP Office

(57) ABSTRACT

A circuit for writing program codes of a basic input/output system (BIOS) is connected to a main circuit and a BIOS. The BIOS stores a BIOS program code and has a BIOS identifier. The circuit includes a data source connection interface, a judgment trigger module and a write module. The data source connection interface stores an available BIOS program code matching with the BIOS. The judgment trigger module judges whether the BIOS is capable of, after a power-on initialization phase starts, completing loading the BIOS program code and performing system initialization in a preset time. If the BIOS is incapable of completing loading the BIOS program code and performing system initialization within the preset time, the judgment trigger module sends a trigger signal. After receiving the trigger signal, the write module downloads the available BIOS program codes according to the BIOS identifier, and writes to the BIOS, to overwrite the current data.

7 Claims, 4 Drawing Sheets

CIRCUIT AND METHOD FOR WRITING PROGRAM CODES OF BASIC INPUT/OUTPUT SYSTEM

BACKGROUND

Technical Field

This disclosure relates to update or restoration of a basic input/output system of a computer system, and particularly to a circuit and a method for writing program codes of a basic input/output system without requiring the computer system to be in a power-on state.

Related Art

In a computer system, a basic input/output system (BIOS) is the indispensable firmware. Since the BIOS stores the most basic software program codes in the computer system, detection and linkage need be performed through the basic input/output system when any hardware of the computer system is enabled. Additionally, the modern BIOS program codes are usually stored in an erasable and writable storage unit, such as an EEPROM or a Flash ROM, and the program codes stored in the storage unit do not disappear when the computer system is shut down. Moreover, a new program code can be written to overwrite or restore an old program code by performing a specific burning program through the computer system. However, for this type of erasable and writable storage unit, the probability that data is damaged is relatively higher; for example, data is damaged by a computer virus or the writing is incomplete when the new program code is written. If as the BIOS program got damaged and it were not discovered in time, then the computer system proceeded to shut down or restart, which will result in the computer system incapable of entering the power-on state again. At this time, it cannot execute the specific burning program via the computer system to write the new program codes in order to overwrite or restore the old program codes.

In the prior art, the applicant has put forward a double-BIOS architecture, where two BIOSs both store program codes, thus being a backup for each other. When it is found that the program codes of one BIOS have been damaged, the other backup BIOS can be used to restore the program codes of the main BIOS. However, the situation that the two BIOSs are damaged at the same time and cannot be repaired is not excluded. At the same time, the mechanism that the double BIOSs are a backup for each other still needs the intervention of the computer system, that is, the computer system must maintain in the power-on state. If the computer system cannot be powered on, the damaged BIOS still cannot be repaired. In this case, a user still needs to deliver the computer system to a supplier for repair.

SUMMARY

In view of the above problems, this disclosure provides a circuit and a method for writing program codes of a basic input/output system, which can restore the BIOS in the case that a computer system cannot complete the power-on operation.

This disclosure proposes a circuit for writing program codes of a basic input/output system, connected to a main circuit and a basic input/output system of a computer system. The basic input/output system has a memory for storing a BIOS program code to make the basic input/output system execute the functions, and the basic input/output system has a BIOS identifier. The circuit for writing program codes of a basic input/output system includes a data source connection interface, a judgment trigger module and a write module.

The data source connection interface is used to acquire an available BIOS program code corresponding to the BIOS identifier. The judgment trigger module is connected to the main circuit, and is used to judge whether the basic input/output system is capable of, after a power-on initialization phase starts, completing loading the BIOS program code and performing the system initialization within a preset time; if the basic input/output system is incapable of completing loading the BIOS program code and performing the system initialization within the preset time, the judgment trigger module sends a trigger signal. The write module is electrically connected to the judgment trigger module, the basic input/output system and the data source connection interface, wherein when the write module receives the trigger signal, the write module establishes the connection with the basic input/output system to acquire the BIOS identifier, the write module establishes the connection with the data source connection interface, and according to the BIOS identifier, downloads the available BIOS program code, and the write module writes the available BIOS program code to the basic input/output system, to overwrite the current data in the basic input/output system.

In a specific embodiment, the data source connection interface is further connected to the main circuit, and is used to serve as a data transmission interface of the main circuit.

In a specific embodiment, after overwriting the current data in the basic input/output system, the write module determines whether the available BIOS program code downloaded from the data source connection interface is in conformity with the data of the basic input/output system through comparison; and if yes, it outputs a message of the successful update.

In a specific embodiment, the circuit for writing program codes of a basic input/output system further includes a BIOS control circuit and a BIOS switching circuit. The BIOS control circuit is connected to the judgment trigger module and the main circuit. The BIOS switching circuit is connected to the basic input/output system, and the write module is connected to the basic input/output system via the BIOS switching circuit, wherein when the judgment trigger module sends the trigger signal, the BIOS control circuit sends a switching signal to the BIOS switching circuit to make the BIOS switching circuit perform switching, and therefore the write module establishes the connection with the basic input/output system.

In a specific embodiment, the circuit for writing program codes of a basic input/output system further includes a bus switching circuit, and the write module is connected to the basic input/output system through the bus switching circuit, wherein when the write module is enabled by the trigger signal, the bus switching circuit performs switching to make the write module connected to the basic input/output system.

This disclosure further proposes a method for writing program codes of a basic input/output system, for writing an available BIOS program code to a basic output system of a computer system when the computer system enters a power-on stage. The method includes:

monitoring, by a judgment trigger module, a power-on state of the computer system, and judging whether a basic input/output system is capable of completing loading a BIOS program code and performing the system initialization within a preset time; and if the basic input/output system is incapable of loading the BIOS program code and performing the system initialization within the preset time, it sends a trigger signal;

enabling a write module by using the trigger signal, and establishing, by the write module, the connection with to the basic input/output system, to acquire a BIOS identifier of the basic input/output system;

establishing, by the write module, the connection with a data source connection interface, and finding an available BIOS program code in conformity with the BIOS identifier through the data source connection interface; and writing, by the write module, the available BIOS program code to the basic input/output system, to overwrite the current data in the basic input/output system.

In a specific embodiment, after overwriting the current data of the basic input/output system, the method further includes a step of determining whether the available program code is in conformity with the current data of the basic input/output system through comparison.

The circuit and method for writing program codes of a basic input/output system in this disclosure mainly can obtain the mastership by the write module in the case of failed BIOS incapable of the computer system completing power-on, to drive the required device for acquiring the BIOS program code, thus overwriting the data of the BIOS, in order to lower down the frequency of failed BIOS and the necessity to deliver the computer system to the supplier for repair.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
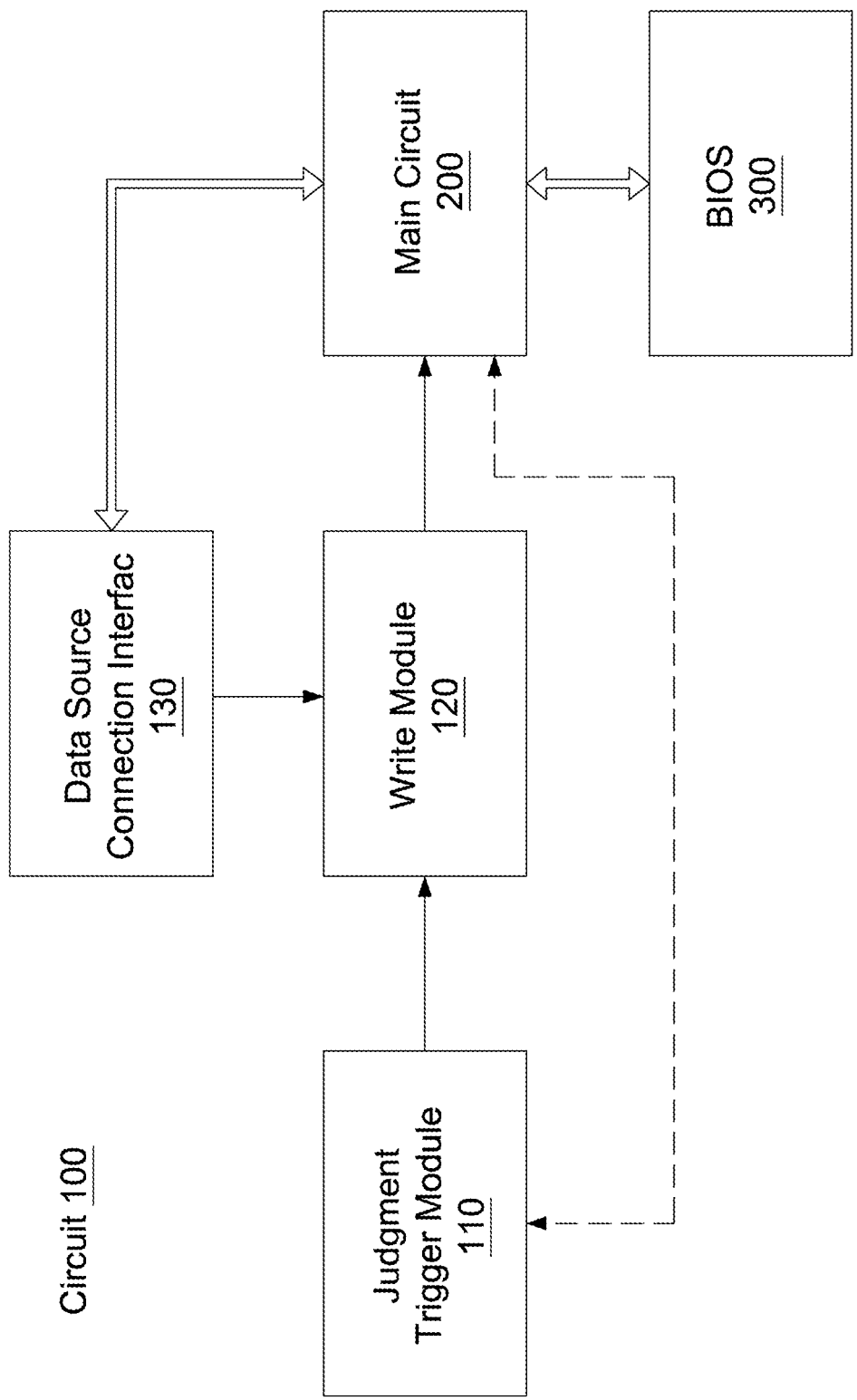
FIG. 1 is a systematic block diagram of a circuit for writing program codes of a basic input/output system according to an embodiment of this disclosure.

Referring to FIG. 1, a circuit 100 for writing program codes of a basic input/output system according to an embodiment of this disclosure is connected to a main circuit 200 of a computer system and a basic input/output system 300 (BIOS 300) of the computer system. The main circuit 200 is generally the circuit architecture of a main board of the computer system, but does not include the BIOS 300 of the main board. The BIOS 300 has a memory to store a BIOS program code to make the BIOS 300 execute the functions thereof. In other words, the main circuit 200 and the connected BIOS 300 form the circuit architecture of the main board.

The circuit 100 for writing program codes of a basic input/output system includes a judgment trigger module 110, a write module 120 and a data source connection interface 130. The data source connection interface 130 is electrically connected to the main circuit 200 to form a part of the foregoing main board, and serves as a transmission interface of the main circuit 200. The data source connection interface 130 can be used to acquire an available BIOS program code, wherein the available BIOS program code matches with the BIOS identifier of the BIOS 300, and can be used to overwrite data of the BIOS 300 and enable the BIOS 300 to execute the functions thereof.

The data source connection interface 130 could be a local transmission interface, such as a USB interface, an IEEE 1394 interface, an eSATA interface, or a Bluetooth wireless communication interface. That is to say, the data source connection interface 130 can be used to connect to a data source, such as a flash drive, a hard drive, a NAS or another Bluetooth device, so as to acquire the available BIOS program code stored in the data source. The data source connection interface 130 could also be a network interface connected to a remote server, which includes a cable network interface and a wireless network interface, such as WIFI and a network card, and can connect and log in to the remote server, so as to use the remote server as a data source.

As shown in FIG. 1, the judgment trigger module 110 is connected to the main circuit 200, and is used to monitor the state of the BIOS 300 at the power-on initialization phase of the computer system. The judgment trigger module 110 judges whether the BIOS 300 is capable of, after the power-on initialization phase starts, completing loading the BIOS program code and performing the system initialization within a preset time.

If the BIOS 300 is incapable of completing loading the BIOS program code and performing the system initialization within the preset time, the judgment trigger module 110 judges that the BIOS 300 cannot work normally (the reason may be the damage of the hardware, or may also be the damage of the program codes), and the trigger module 110 sends a trigger signal.

As shown in FIG. 1, the write module 120 is electrically connected to the judgment trigger module 110, the BIOS 300 and the data source connection interface 130. When the write module 120 receives the trigger signal sent by the judgment trigger module 110, the write module 120 is enabled. At this time, the write module 120 establishes the connection with the BIOS 300, to acquire the BIOS identifier. Then, the write module 120 establishes the connection with the data source connection interface 130, and according to the BIOS identifier, checks whether the data source connected to the data source connection interface 130 stores an available BIOS program code in conformity with the BIOS identifier. If there is an available BIOS program code in conformity with the BIOS identifier, the write module 120 executes a BIOS program code write operation, downloads the available BIOS program code, and writes the BIOS program code to the BIOS 300, so as to overwrite current data in the BIOS 300.

Finally, the write module 120 determines, through comparison, whether the available BIOS program code downloaded from the data source connection interface 130 is in conformity with the data in the BIOS 300. If yes, it outputs a message of the successful update, and restarts the computer system to make the computer system be powered on normally. If not, the write module 120 outputs a message of the failed update, and restarts the computer system or shuts down the computer system. Generally speaking, if the update failure occurs, the reason often could be that the hardware of the BIOS 300 has been damaged, and at this moment, the failure message and the computer shutdown may remind a user that the computer system needs to be delivered to a supplier for repair.

Figure 2:
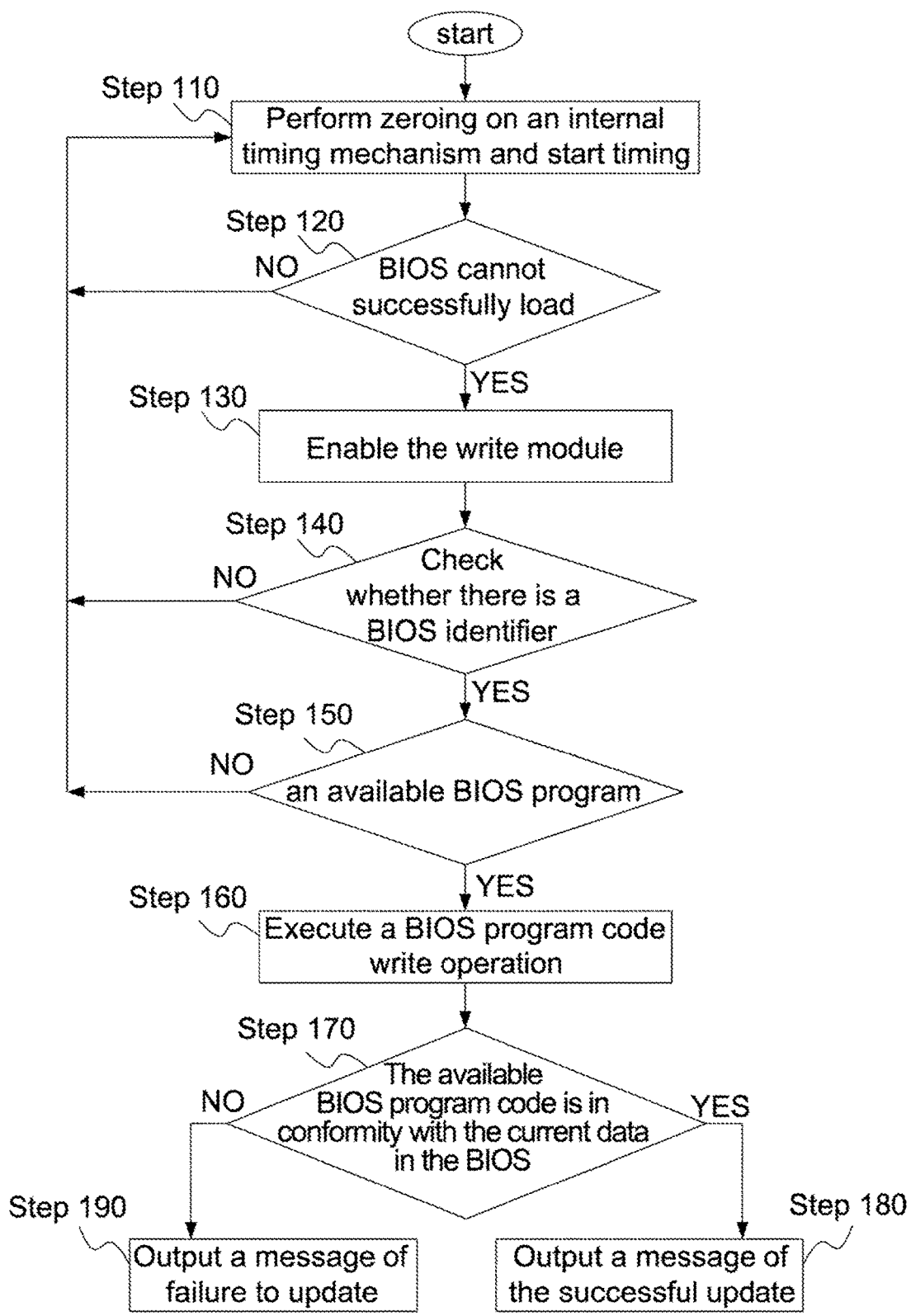
FIG. 2 is a flowchart of a method for writing program codes of a basic input/output system according to an embodiment of this disclosure.

As shown in FIG. 1 and FIG. 2, the process of a specific method for writing program codes of a basic input/output system of this disclosure is described as in the followings.

As shown in FIG. 1 and FIG. 2, when a computer system enters the power-on stage, the circuit 100 for writing program codes of a basic input/output system of this disclosure is also initiated simultaneously. At this time, the BIOS 300 executes the power-on self test (POST), in order to perform the initialization operations of various hardware of the computer system and guide the computer system to load an operating system.

In Step 110, after the circuit 100 for writing program codes of a basic input/output system starts, the judgment trigger module 110 performs zeroing on an internal timing mechanism thereof and starts timing. This timing mechanism can be a watchdog timer (WDT), wherein the WDT is set up a preset time internally and is used to judge whether the BIOS 300 of the computer system can complete loading a program code of the BIOS 300 within the preset time.

In Step 120, the judgment trigger module 110 monitors the power-on state of the computer system, and compares the elapsed time of the timing mechanism and the loading state of the BIOS program code. If the elapsed time of the timing mechanism has reached the preset time, and the BIOS 300 cannot successfully load and start the BIOS program code, the judgment trigger module 110 judges that the BIOS 300 is incapable of completing loading the BIOS program code and performing the system initialization within the preset time. That is, the BIOS 300 fails to load the BIOS program code and to execute the POST operation.

In Step 130, after judging that loading the BIOS program code and executing the POST operation fail, the judgment trigger module 110 sends a trigger signal to the write module 120, to enable the write module 120.

In Step 140, the write module 120 establishes the connection with the BIOS 300, to acquire a BIOS identifier. Such a BIOS identifier may include the hardware model of the BIOS 300 system and the hardware model of the main circuit 200, and this information is used to download the correct BIOS program code. The write module 120 firstly checks whether there is a BIOS identifier; and if yes, it reads the BIOS identifier, and executes the next step.

In Step 150, next, the write module 120 establishes the connection with the data source connection interface 130, and finds a BIOS program code in conformity with the BIOS identifier through the data source connection interface 130, to judge whether an available BIOS program code can be acquired.

In Step 160, the write module 120 executes a BIOS program code write operation, to write the available BIOS program code to the BIOS 300, to overwrite the current data in the BIOS 300.

In Step 170, the write module 120 determines whether the available BIOS program code is in conformity with the current data in the BIOS 300 through comparison. In Step 180, if yes, it outputs a message of the successful update, and restarts the computer system to make the computer system be powered on normally. In Step 190, if not, the write module 120 outputs a message of failure to update, and restarts the computer system or shuts down the computer system. As described above, if the update failure occurs, the reason often could be that the hardware of the BIOS 300 has been damaged, or the data of the data source connection interface 130 is erroneous, and at this moment, the failure message and the computer shutdown may remind a user that the computer system needs to be delivered to a supplier for repair.

Figure 3:
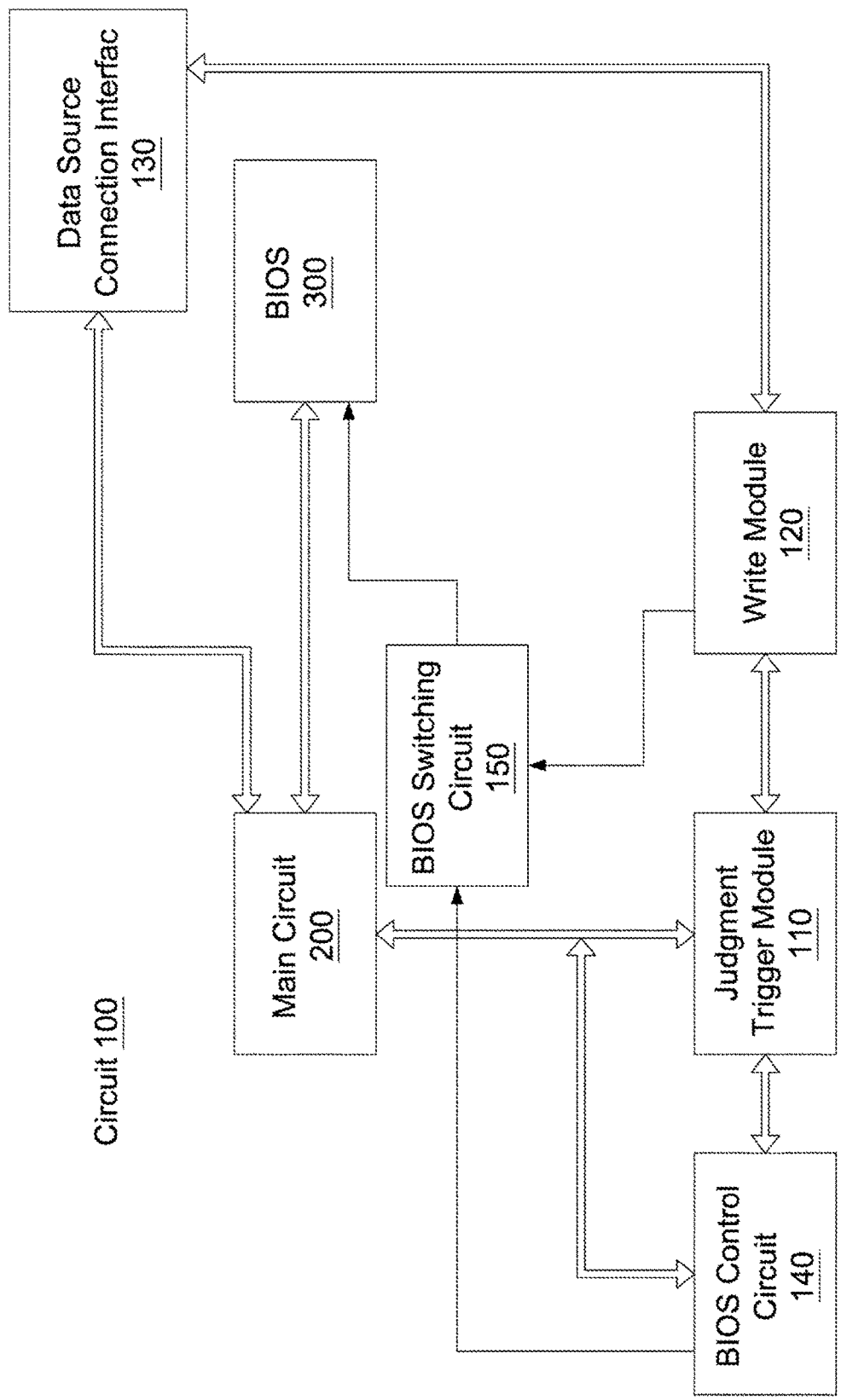
FIG. 3 is a circuit block diagram of a circuit for writing program codes of a basic input/output system according to an embodiment of this disclosure.

Referring to FIG. 3, the embodiment of this disclosure discloses the specific implementation of the circuit 100 for writing program codes of a basic input/output system, which is connected to the main circuit 200 of the computer system and the main circuit 200 is connected to the BIOS 300. The BIOS 300 stores a BIOS program code, to make the BIOS 300 be able to execute the functions thereof, and to perform a POST operation on the main circuit 200.

As shown in FIG. 3, the circuit 100 for writing program codes of a basic input/output system further includes a BIOS control circuit 140 and a BIOS switching circuit 150.

The BIOS control circuit 140 is connected to a judgment trigger module 110 and the main circuit 200, and is connected to the BIOS 300 through the BIOS switching circuit 150, in order to change the connection state of the BIOS 300.

The BIOS switching circuit 150 is connected to the BIOS 300, and the write module 120 is connected to the BIOS 300 through the BIOS switching circuit 150.

In a normal power-on state, the judgment trigger module 110 does not send a trigger signal, but maintains the connection with the BIOS 300 through the main circuit 200. If the BIOS 300 does not drive the main circuit 200 to perform POST, to make the judgment trigger module 110 send a trigger signal, the BIOS control circuit 140 sends a switching signal to the BIOS switching circuit 150, and the BIOS switching circuit 150 performs switching, so that the write module 120 establishes the connection with the BIOS 300.

Figure 4:
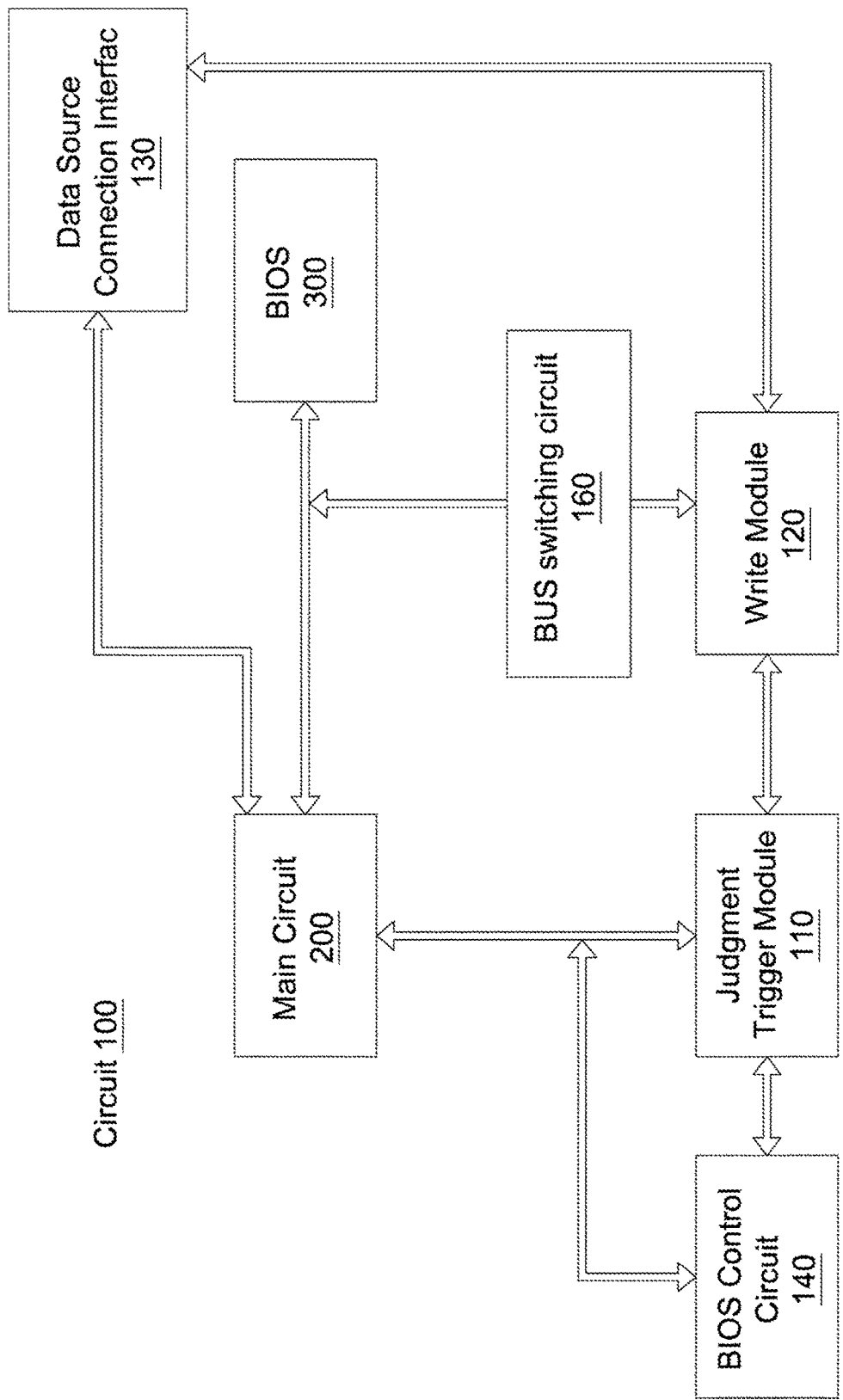
FIG. 4 is a circuit block diagram of a circuit for writing program codes of a basic input/output system according to an embodiment of this disclosure.

As shown in FIG. 4, another specific embodiment of the circuit 100 for writing program codes of a basic input/output system is shown, wherein the circuit 100 for writing program codes of a basic input/output system further includes a BUS switching circuit 160. A write module 120 is connected to a BIOS 300 through the BUS switching circuit 160. When the write module 120 is enabled by a trigger signal, the BUS switching circuit 160 makes the write module 120 be connected to the BIOS 300; and in the case that the BIOS 300 operates normally, the BUS switching circuit 160 maintains the write module 120 in a disconnection state.

The circuit 100 and the method for writing program codes of a basic input/output system of this disclosure mainly can make, in the case of the failed BIOS 300 incapable of the computer system completing power on, the write module 120 obtains the mastership to drive the required device to acquire the BIOS program codes, thus to overwrite the data of the BIOS 300, in order to lower down the frequency of the failed BIOS and the necessity to deliver the computer system to a supplier for repair.

What is claimed is:

1. A circuit for writing program codes of a basic input/output system, connected to a main circuit and a basic input/output system of a computer system, wherein the basic input/output system having a memory for storing a BIOS program code, so that the basic input/output system executes the functions, and the basic input/output system has a BIOS identifier, characterized in that, the circuit for writing program codes of a basic input/output system comprises:

a data source connection interface, used to acquire an available BIOS program code corresponding to the BIOS identifier;

a judgment trigger circuit, connected to the main circuit, used to judge whether the basic input/output system is capable of, after the power-on initialization phase starts, completing loading the BIOS program code and performing the system initialization within a preset time, wherein if the basic input/output system is incapable of completing loading the BIOS program code and performing the system initialization within the preset time, the judgment trigger circuit sends a trigger signal; and a write circuit, electrically connected to the judgment trigger circuit, the basic input/output system and the data source connection interface, wherein when the write circuit receives the trigger signal, the write circuit and the basic input/output system establish the connection to acquire the BIOS identifier, the write circuit and the data source connection interface establish the connection, and according to the BIOS identifier, download the available BIOS program code, and the write circuit writes the available BIOS program code to the basic input/output system, to overwrite the current data in the basic input/output system.

2. The circuit for writing program codes of a basic input/output system according to claim 1, characterized in that, the data source connection interface is further connected to the main circuit.

3. The circuit for writing program codes of a basic input/output system according to claim 1, characterized in that, after the write circuit overwrites the current data in the basic input/output system, the write circuit determines whether the available BIOS program code downloaded via the data source connection interface is in conformity with the data of the basic input/output system through comparison; and if yes, it outputs a message of the successful update.

4. The circuit for writing program codes of a basic input/output system according to claim 1, characterized by, further comprising:

a BIOS control circuit, connected to the judgment trigger circuit and the main circuit; and a BIOS switching circuit, connected to the basic input/output system, and the write circuit connected to the basic input/output system through the BIOS switching circuit, wherein when the judgment trigger circuit sends the trigger signal, the BIOS control circuit sends a switching signal to the BIOS switching circuit, so that the BIOS switching circuit performs switching to make the write circuit and the basic input/output system establish the connection.

5. The circuit for writing program codes of a basic input/output system according to claim 1, characterized by, further comprising:

a BUS switching circuit, wherein the write circuit is connected to the basic input/output system through the BUS switching circuit, and when the write circuit is enabled by the trigger signal, the BUS switching circuit performs switching to make the write circuit connected to the basic input/output system.

6. A method for writing program codes of a basic input/output system, used for writing an available BIOS program code to a basic output system of a computer system when the computer system enters a power-on stage, characterized in that, the method comprises:

monitoring, by a judgment trigger module, a power-on state of the computer system, and judging whether a basic input/output system is capable of completing loading a BIOS program code and performing the system initialization within a preset time; and if the basic input/output system is incapable of loading the BIOS program code and performing the system initialization within the preset time, it sends a trigger signal;

enabling a write module by using the trigger signal, and establishing, by the write module, connection to the basic input/output system, to acquire a BIOS identifier of the basic input/output system;

establishing, by the write module, connection to a data source connection interface, and finding an available BIOS program code in conformity with the BIOS identifier through the data source connection interface; and writing, by the write module, the available BIOS program code to the basic input/output system, to overwrite current data of the basic input/output system.

7. The method for writing program codes of a basic input/output system according to claim 6, characterized by, further comprising a step of determining, after the overwriting the current data of the basic input/output system, whether the available BIOS program code is in conformity with the current data of the basic input/output system through comparison.

* * * * *